(12) United States Patent
Peterson et al.

(10) Patent No.: US 8,375,399 B2
(45) Date of Patent: Feb. 12, 2013

(54) METHOD, APPARATUS AND COMPUTER PROGRAM TO PERFORM DYNAMIC SELECTION OF SERIALIZATION PROCESSING SCHEMES

(75) Inventors: Robert W Peterson, Plano, TX (US); Thomas T Wheeler, Frisco, TX (US); Robert DeAnna, McKinney, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 552 days.

(21) Appl. No.: 12/629,938

(22) Filed: Dec. 3, 2009

(65) Prior Publication Data

US 2011/0138168 A1 Jun. 9, 2011

(51) Int. Cl.
 *G06F 13/00* (2006.01)
(52) U.S. Cl. .................. 719/313; 719/230; 719/231
(58) Field of Classification Search .................. 719/313, 719/230, 231
See application file for complete search history.

(56) References Cited

U.S. PATENT DOCUMENTS

| | | | |
|---|---|---|---|
| 7,150,004 B2 * | 12/2006 | Russell et al. ................. | 717/118 |
| 7,574,710 B1 * | 8/2009 | Jeyaraman et al. ........... | 719/313 |
| 7,711,836 B2 * | 5/2010 | Videlov et al. ................ | 709/230 |
| 2002/0035645 A1 * | 3/2002 | Tuatini .......................... | 709/310 |
| 2005/0144218 A1 * | 6/2005 | Heintz .......................... | 709/202 |
| 2010/0058364 A1 * | 3/2010 | Sherrill et al. ................ | 719/328 |
| 2010/0293283 A1 * | 11/2010 | Andrade et al. .............. | 709/230 |

\* cited by examiner

*Primary Examiner* — Andy Ho
(74) *Attorney, Agent, or Firm* — Stolowitz Ford Cowger LLP

(57) ABSTRACT

The present application is directed to a method, apparatus a computer program product configured to perform certain operations of dynamic serialization. In one example, a message is received which includes at least one message element requiring serialization. A first message element of the message is examined. A serialization scheme from a serialization scheme library is selected based on the at least one examined attribute of the first message element. Then, at least the first message element is encoded using the serialization scheme selected.

25 Claims, 4 Drawing Sheets

METHOD, APPARATUS AND COMPUTER PROGRAM TO PERFORM DYNAMIC SELECTION OF SERIALIZATION PROCESSING SCHEMES

FIELD OF THE INVENTION

The present invention is related to dynamic selection of serialization schemes used to perform encoding on messages.

BACKGROUND OF THE INVENTION

Serialization is a process of converting an in-memory representation of an object into a corresponding byte stream. Deserialization is a process of converting a byte stream into the corresponding object. These two processes are commonly used when information is transferred between nodes on a network. For example, complex messages, such as complex Java application objects or sensitive data, need to be serialized prior to being sent across the network.

Serialization of data may be performed as a subtask of remote method invocation (RMI). This is a way for a programmer, using the Java programming language and development environment, to write object-oriented programming in which objects on different computers can interact in a distributed network. RMI is the Java version of what is generally known as a remote procedure call (RPC), but with the ability to pass one or more objects along with the request. Serialization of data may also be performed as a subtask of encoding an object for persistent data storage.

The object can include information that will change the service that is performed in the remote computer. This is referred to as "moving behavior." For example, when a user at a remote computer fills out an expense account, the Java program interacting with the user could communicate, using RMI, with a Java program in another computer that always had the latest policy about expense reporting. In reply, that program would send back an object and associated method information that would enable the remote computer program to screen the user's expense account data in a way that was consistent with the latest policy. The user and the company both would save time by catching mistakes early. Whenever the company policy changed, it would require a change to a program in only one computer.

An RMI request is a request to invoke the method of a remote object. The request has the same syntax as a request to invoke an object method in the same (local) computer. In general, RMI is designed to preserve the object model and its advantages across a network.

Currently, an object or complex message may be serialized using a single homogenous serialization scheme, which may be applied to every single message element of the complex message.

The existing conventional homogenous solutions impose a common cost to all the individual message elements in a complex message even when particular message elements have different preferred over-the-wire encoding algorithms. High cost processing and unnecessary use of resources (such as processor cycles, memory, network bandwidth etc.) may be consumed to encode, encrypt or perform any of numerous serialization processing schemes to all of the message elements of a particular message. However, serialization schemes which encrypt each of the message elements of a particular message may be unnecessary when only one message element requires such a serialization scheme.

As illustrated below in TABLE 1, the conventional serialization schemes are applied without any consideration for the individual portions of the entire message (i.e., homogenous serialization),

TABLE 1

```
public class CurrentSolution {
    public String smallString = "A short String.";
    public String bigString = buildBigString( );
    public String privateString =
        "This string should be encyrpted.";
    public byte[ ] smallByteArray = new byte[10];
    public byte[ ] bigByteArray = new byte[10000];
    public static String buildBigString( ) {
        // Return a very large String, e.g.,
        // more than 10,000 characters.
        byte[ ] big = new byte[40000];
        String result = new String(big);
        return result;
    }
    public byte[ ] serialize(
            OutputStream os)
            throws IOException {
        byte[ ] encodedBuffer = new byte[2000];
        ObjectOutputStream oos =
            new ObjectOutputStream( os);
        oos.writeObject(smallString);
        oos.writeObject(bigString);
        oos.writeObject(encrypt( ));
        oos.writeObject(smallByteArray);
        oos.writeObject(bigByteArray);
        return encodedBuffer;
    }
    public byte[ ] encrypt( ) {
        byte[ ] result = new byte[3000];
        // Compute the encrypted String
        return result;
    }
}
```

Conventional solutions of serialization are homogenously applied to the entire message such that the entire message is encoded under the same encoding mechanism that provides unnecessary encoding to portions of the message which are not sensitive. A more efficient serialization scheme would apply the encoding mechanism to only the portion(s) of the message that actually require the added protection of a particular encoding scheme. The other less sensitive portions of the message would be encoded according to a less stringent or simpler form of serialization.

SUMMARY OF THE INVENTION

An optimized method of performing dynamic serialization selection examines a message element by element to select the serialization scheme best suited to serialize each portion of the message one element at a time. A corresponding deserialization mechanism uses information encoded in the serialized byte stream to determine which deserializer to use for each encoded message element.

One example embodiment of the present inventive concept may include a method of dynamic serialization of a message. The method may include receiving a message including at least one message element requiring serialization, and examining a first message element of the message. The method may further include selecting a serialization scheme from a serialization scheme library based on at least one examined attribute of the first message element, and encoding at least the first message element using the serialization scheme selected.

Another example embodiment of the present inventive concept may include an apparatus configured to perform dynamic serialization of a message. The apparatus may include a receiver configured to receive a message including at least one message elements requiring serialization. The apparatus may also include a serialization module configured to examine a first message element of the message and select a serialization scheme from a serialization scheme library based on at least one attribute included in the first message, and encode at least the first message element using the serialization scheme selected.

Another example embodiment of the present inventive concept may include a computer readable medium that includes a computer program product that when executed causes a processor to perform certain operations. Those operations may include receiving a message including at least one message element requiring serialization, and examining a first message element of the message. Other operations may include selecting a serialization scheme from a serialization scheme library based on at least one examined attribute of the first message element, and encoding at least the first message element using the serialization scheme selected.

DETAILED DESCRIPTION OF THE PREFERRED EMBODIMENTS

Figure 1:
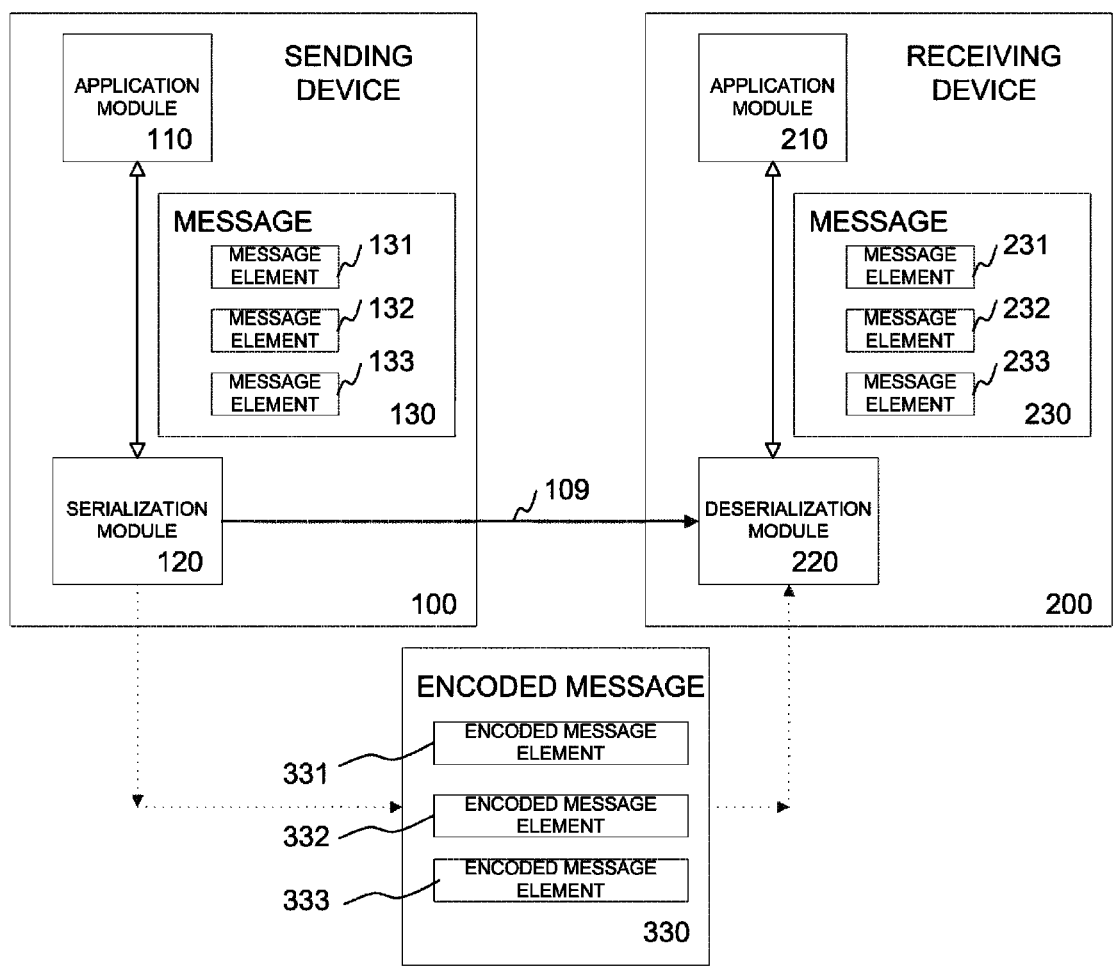
FIG. 1 illustrates a sending device and a receiving device according to an example embodiment of the present inventive concept.

FIG. 1 illustrates a sending device 100 and a receiving device 200 according to an example embodiment of the present inventive concept. The devices may be personal computers, servers, or other computing devices which are capable of processing a message 130/230 and serializing the message's 130 individual message elements 131, 132 and 133 and deserializing the message's 230 individual message elements 231, 232, 233.

The sending and receiving devices 100/200 may include an application module 110/210, a serialization/deserialization module 120/220, and may also include a communication link 109 that communicatively connects the serialization module 120 of the sending device 100 with the deserialization device 220 of the receiving device 200. The communication link 109 may be a physical link that physically connects the sending and receiving devices 100/200 directly. Or, in the alternative, the communication link may instead be a logical link established over a wired or a wireless communications network. For example, the logical link may be established over a local area network, wide area network or via the Internet, etc.

The message 130 may be initially generated by the application module 110 via a user application operating on the sending device 100. In operation, when a message 130 is desired to be sent from the sending device 100 to the receiving device 200, the message 130 must be serialized. The application module 110 stores the message 130 to be serialized via the serialization module 120. Upon receiving an indication to transfer the message 130 to the serialization module 120, the application module 110 will transfer the message 130 to the serialization module 120 to be serialized.

As may be observed from the message 130 illustrated in FIG. 1, the message includes individual message elements 131, 132 and 133, which make up the message 130. The individual message elements 131, 132 and 133 are created during the generation of the message 130. Each of the individual message elements 131-133 may be encoded according to an encoding algorithm prescribed by the particular serialization scheme currently adopted by the serialization module 120. However, the individual message elements 131-133 may instead be encoded according to different serialization schemes, which may be applied individually to each of the message elements 131-133.

In one example, a first message element 131 may be encoded according to a first selected serialization scheme which may provide, for example, a basic encapsulation and packaging procedure which is based on a pre-defined set of protocols and/or procedures adopted by the first serialization scheme.

Alternatively, the second message element 132 may be encoded by a second serialization scheme that is selected especially for the second message element 132. For instance, the second message element 132 may include sensitive information, such as, for example, patient records, and thus, may require a certain level of encryption offered only by the second serialization scheme. That level of encryption may offer a greater level of security than the first level of encryption. Therefore, the second message element 132 would have to be encoded and encrypted according to the second serialization scheme to preserve the integrity and confidentiality of the sensitive data.

The process of encoding the individual message elements 131-133 via a dynamic serialization scheme selection method includes analyzing each individual message element one at a time and determining each element's serialization scheme based on the element's attributes. Once each message element is properly encoded, an encoded message 330 is generated by the serialization module. The encoded message 330 may include individually encoded message elements 331, 332 and 333, which may be encoded differently from one another.

The number and the order of the encoded message elements 331-333 may vary and may not match the number of message elements of the original message 130. For example, if the original message 130 includes three message elements 131-133, the encoded message elements which correspond to the original message elements 131-133 may be greater or fewer in number. In one example, two message elements requiring the same type of encoding may be bundled together in a single encoded message element. In such a case, the same message 130 may not produce the same exact encoded message 330 on successive serialization processes. This may reduce the number of encoded message elements by bundling together some of the encoded message elements to accommodate certain encodings schemes adopted by the serialization module.

Once the message is encoded, the encoded message 330 is transferred to the deserialization module 220 of the receiving device 200 where it is deserialized into a message 230 having individual message elements 231, 232 and 233 corresponding to the original message elements 131, 132 and 133. The deserialization module 220 may perform a library lookup based on metadata that is included in the received serialized message 230. Further details of the library are discussed in detail below.

Figure 2:
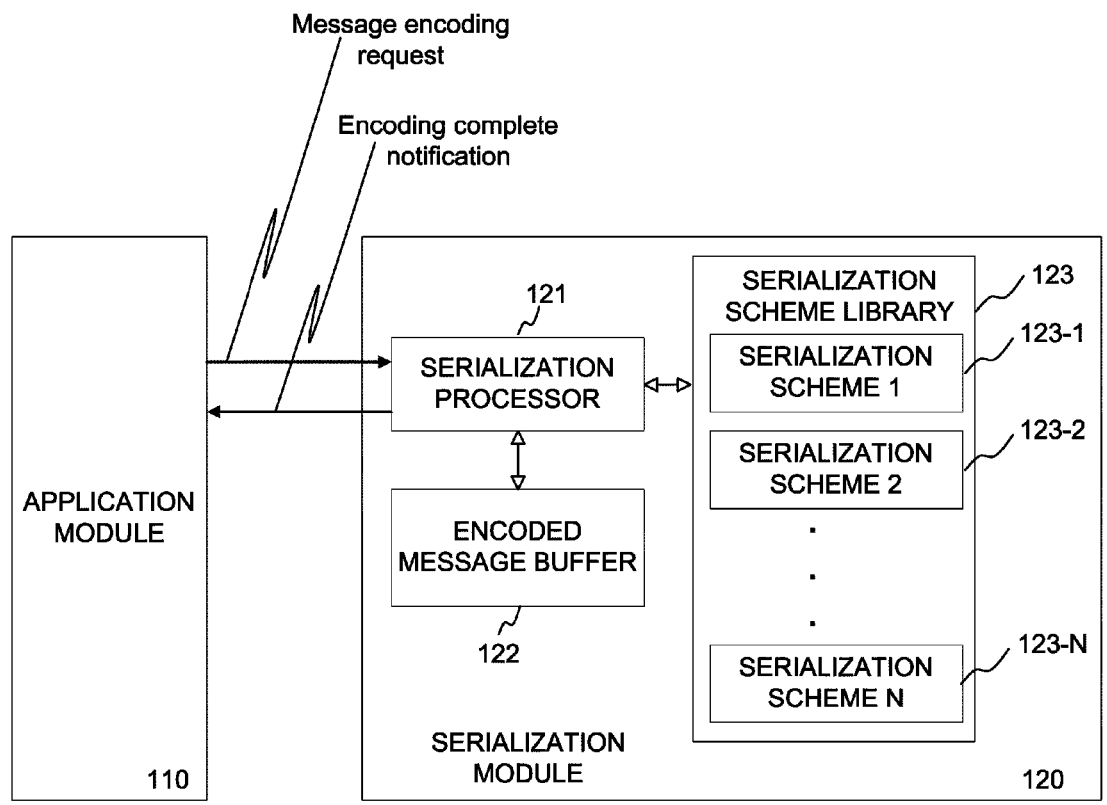
FIG. 2 illustrates an example of a serialization module and its communication with an application module according to an example embodiment of the present inventive concept.

FIG. 2 illustrates a detailed example of the serialization module 120 and its communication with the application module 110, according to an example embodiment of the present inventive concept. The serialization module 120 includes a serialization processor 121, which is coupled to a serialization scheme library 123, and which is also coupled to an encoded message buffer 122.

The serialization scheme library 123 includes various serialization schemes 123-1, 123-2 to 123-N. Those serialization schemes may be selected one at a time to accommodate the serialization encoding needs of the message 130 based in whole or in part on the individual message elements 131-133. The serialization scheme library 123 may be part of the serialization module 120, however, the serialization scheme library 123 may also be located remotely and away from the sending device 100 and the serialization module 120.

In operation, the application module 110 will send a message encoding request to the serialization processor 121. The request may include the message itself or portions of the message which define the sensitivity and encoding requirements of the message elements which make up the message. The serialization processor 121 will examine the request to determine the serialization requirements of the message elements and will access the serialization scheme library 123 to obtain the appropriate serialization scheme for the message element currently being examined. The serialization processor may repeat the examining and accessing of serialization schemes from the serialization scheme library for each message element received.

Once the message elements are examined and the serialization schemes are selected based on the requirements of the message elements' data, the serialization processor will serialize the data of the message elements. The serialization may include encoding, encrypting, compressing and other serialization related procedures. The serialized message elements are then stored in the encoded message buffer 122. An encoding message complete notification is sent to the application module 110 from the serialization module 120. The application module 110 may then have access to the serialized encoded message elements stored in the encoded message buffer 122.

Figure 4:
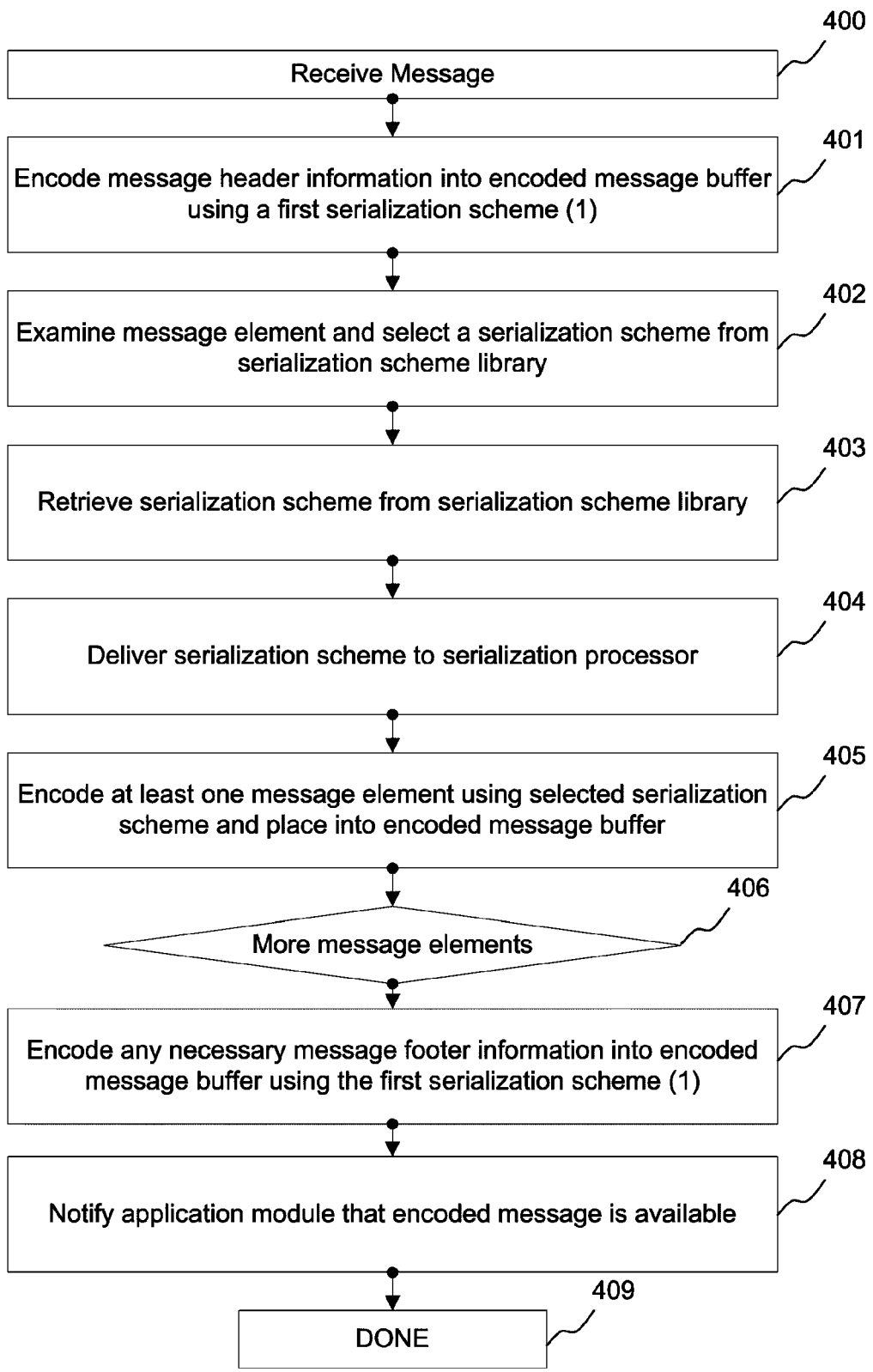
FIG. 4 illustrates an example of serialization module processing according to an example embodiment of the present inventive concept.

A more detailed example of the serialization module processing is illustrated in the flow diagram of FIG. 4, according to an example embodiment of the present inventive concept. Initially, a message that is sent from the application module 110 is received at the serialization module 120 (operation 400). Next, message header information may be encoded into the encoded message buffer 122 using a first serialization scheme (1) (operation 401). The initial message element of the message 130 may then be examined, and a serialization scheme may be selected from the serialization library 123 (operation 402).

After the serialization scheme has been selected based in whole or in part on one or more attributes of the message element, the serialization scheme is retrieved from the serialization scheme library 123 (operation 403). The serialization scheme is then delivered to the serialization processor 121 (operation 404). The serialization processor 121 may then encode at least one message element using the selected serialization scheme and place the encoded message element into the encoded message buffer 122 (operation 405).

It may then be determined whether there are additional message elements of the message 130 to be encoded (operation 406), and, if so, the above operations (operations 402-405) may be again performed until all of the message elements have been encoded. Next, any necessary message footer information may be encoded and stored in the encoded message buffer 122 (operation 407). The serialization module 120 may then notify the application module 110 that the message has been encoded (operation 408). The encoding operation may then be completed (operation 409).

Referring to operation 402, the selection of a serialization scheme may be based on a variety of criteria. For example, the size of the message element (e.g., an argument's size in a remote method invocation (RMI)), sensitivity/confidentiality of the message element, characteristics of a remote receiver, and characteristics of the connection (e.g., bandwidth, latency, reliability, cost etc.). Other criteria may include the complexity of the arguments included in the message element, the name or a tag associated with the message element, frequency of serialization of the message element, information inferred from encodings used in describing a message on the same network connection, and an explicit request for a serialization scheme included in a deserialization message on the same network connection.

The serialization processor 121 may be provided a context for each message 130 with the message encoding request. Then, each message element also associated with a message element context which is provided by the serialization processor 121 can reuse the message context for message elements. The data of the message 130 may be examined dynamically in-context each time serialization is requested.

During a first transmission of serialized data of a first message, the first message may be transferred according to a particular serialization scheme or schemes which encode the message elements of the first message. The first transmission, for example, may treat certain message elements as sensitive. However, in a subsequent transmission, the same exact message may be serialized according to more or less stringent encoding requirements. In such a case, a previously transmitted message element may be again transferred according to a different serialization scheme. Changing the sensitivity of a previously transferred message element may be performed via instructions received at the serialization processor 121, and/or from information received from a different routing connection that a message is currently being sent to its target destination.

A parameter serialization scheme may be determined by characteristics of the message and/or parameters such as whether parameter types are primitive types or complex objects, and whether the parameters include confidential information that needs to be encrypted. The individual messages may be treated differently based on certain dynamic criteria that may be applied to some of the individual messages elements, while other message elements are not serialized in the same manner. For example, a complex message may be encoded in one prescribed manner. Other messages that contain sensitive information, for example, such as, a user id (ID) or health related information may require an encryption serialization that is used solely for encrypting and encoding just that portion of the message which is sensitive.

One example embodiment may implement a remote method invocation (RMI) that begins on the sender and which may serialize each argument differently when sent over the network to a remote computer. If, however, the serialization or deserialization schemes fail due to a lack of the serialization scheme being accessible in the serialization scheme library 123, the serialization scheme may be retrieved from other sources. For example, the serialization and deserialization modules 120 and 220 may be able to retrieve the serialization scheme on-demand from a remote source.

TABLE 2 is an example of a case where a different serialization method is selected based on the complexity of the message

```
/**
 * An interface declaring the methods implemented by a
 * library compression implementation.
 */
public interface Compression {
  /**
   * Compress a String.
   */
  String compress(String aString);

/**
   * See if compression will reduce the size of a
String
   * by percentage per cent.
   */
  boolean isCompressable(String aString, int
percentage);
}

// ======================

/**
 * An annotation that applies to an attribute (field).
If
 * ifUnencryptedConnection() returns true, the
attribute
 * should be encrypted if the communcations link is
not.
 * The result of encryptionStrength() suggests the
minimum
 * acceptable encryption quality.
 */
@Retention(RetentionPolicy.RUNTIME)
@Target(value = ElementType.FIELD)
public @interface Encrypted {
  EncryptionContext context();

EncryptionStrength strength();
}

// ======================

/**
 * An enumeration listing the preferred encryption
 * contexts.
 */
public enum EncryptionContext {
```

```
  ALWAYS, NEVER, ONLY_IF_LINK_UNENCRYPTED
}

// ======================

/**
 * An enumeration listing the possible encryption
 * strengths.
 */
public enum EncryptionStrength {
  MEDIUM, NONE, STRONG, WEAK
}

// ======================

/**
 * An annotation that applies to an attribute. If set to
 * true, the attribute should be encrypted.
 */
@Retention(RetentionPolicy.RUNTIME)
@Target(value = ElementType.FIELD)
public @interface SerializationSize {
  boolean large();
}

// ======================

/**
 * The context for the message as a whole, which normally
 * deals with the characteristics of the connection and the
 * entities at each end of the connection.
 */
public class MessageContext {
  boolean fastConnection;
  boolean fastLocalProcessor;
  boolean fastRemoteProcessor;
  boolean secureConnection;
}

// ======================

/**
 * An interface declaring the methods implemented by a
```

```
 * library of serialization modules.  The implementation
 * of this interface is element 123 of Figure 2.
 */
public interface SerializationSchemeLibrary {
  SerializationScheme lookupSerializationScheme(String query);
}

// ======================

/**
 * An interface declaring the methods implemented by a
 * library serialization implementation. Implementations of
 * this interface correspond to elements 123-1 through 123-N
 * in Figure 2.
 */
public interface SerializationScheme {
  byte[] serialize(Object anObject);
}

// ======================

/*
 * The class that will be transferred from the sending
 * device to the receiving device.  This is element 130 of Figure 1.
 */
public class Message implements Serializable {

/**
   * Build and return a large String.
   */
  public static String buildBigString() {
    byte[] big = new byte[40000];
    String result = new String(big);
    return result;
  }

/*
   * The following lines declare the attributes that are the
   * message elements. Each of these five attributes is a
   * message element, i.e., one of 131, 132, or 133 of
```

```
   * Figure 1.
   *
   * The annotations (the identifiers starting with @)
   * provide metadata about the attributes to which each
   * applies. The "@SerializationSize(large = true)" marks a
   * String as a candidate for processing to reduce its
   * size. The "@Encrypted" annotation, if present,
   * describes of how encryption of the field should be
   * handled.
   */
  @SerializationSize(large = true)
  public byte[] bigByteArray = new byte[10000];

@SerializationSize(large = true)
  public String bigString = buildBigString();

@Encrypted(context =
    EncryptionContext.ONLY_IF_LINK_UNENCRYPTED,
         strength = EncryptionStrength.MEDIUM)
  @SerializationSize(large = false)
  public String privateString =
    "This string should be encyrpted if the link isn't.";

@SerializationSize(large = false)
  public byte[] smallByteArray = new byte[10];

@SerializationSize(large = false)
  public String smallString = "A short String.";

}

// ======================

/**
 * The class that manages serialization. This is elements
 * 120 and 121 of Figure 2.
 */
public class SerializationProcessor {

/**
   * The message to be serialized.
```

```
   */
  private Message theMessage;

/*
   * This is a reference to the serialization library, i.e.,
   * a reference to element 123 of Figure 2.
   */
  private SerializationSchemeLibrary
theSerializationModuleLibrary;

/**
   * Constructor, through which the serialization processor
   * gets references to the object to be serialized, i.e.,
   * the message, and the library of serialization schemes.
   */
  SerializationProcessor(
        Message aMessage,
        SerializationSchemeLibrary
aSerializationModuleLibrary) {
    theMessage = aMessage;
    theSerializationModuleLibrary =
aSerializationModuleLibrary;
  }

/*
   * Do the encryption, if it is requested. The strength of
   * the encryption depends on the value retrieved from the
   * field's encryption annotation. If the annotation
   * specifies no encryption we just return the input
   * string.
   */
  private String encrypt(String aString,
        EncryptionStrength strength) {
    if (strength == EncryptionStrength.NONE)
      return aString;
    /*
     * Retrieve the appropriate serializer. This is an
     * example of the "select a serialization scheme from
     * serialization scheme library" activity of operations
```

```
     * 402, 403, and 404 in Figure 4.
     */
    SerializationScheme encryptor =
theSerializationModuleLibrary .lookupSerializationScheme("type=encryption,
parameter="
                    + strength.name());
    /*
     * Invoke the serialization scheme retrieved from
the
     * serialization module library. This is step 405
in
     * Figure 4.
     */
    String encryptedString = new String(encryptor
            .serialize(aString));
    return encryptedString;
  }

/**
   * The method to serialize an SerializationProcessor
   * object. This is operation 400, i.e., a message
   * requesting serialization of the Message object.
   */
  public byte[] serialize(ByteArrayOutputStream os,
          MessageContext msgContext) throws
IOException {
    // Activity 401, write the header.
    ObjectOutputStream oos = new
ObjectOutputStream(os);
    // First handle the String attributes.
    writeString(msgContext, oos,
theMessage.smallString
            .getClass(), theMessage.smallString);
    /*
     * Each additional statement that processes a
field of
     * the message is an example of the decision point
     * element 406 of Figure 4.
     */
    writeString(msgContext, oos, theMessage.bigString
            .getClass(), theMessage.bigString);
    writeString(msgContext, oos,
theMessage.privateString
            .getClass(), theMessage.privateString);
```

```
    /*
     * Now serialize the byte arrays.
     */
    writeByteArray(os, theMessage.smallByteArray);
    writeByteArray(os, theMessage.bigByteArray);

/*
     * In this example there is no footer data to
illustrate
     * step 407 of Figure 4, but if footer data was
written
     * it would happen here.
     */

/*
     * Returning the byte array containing the
serialized
     * message fulfills step 408 of Figure 4,
notifying the
     * application module that the encoded message is
     * available.
     */
    return os.toByteArray();
  } private void writeByteArray(ByteArrayOutputStream
os,
          byte[] aByteArray) throws IOException {
    /*
     * Now serialize a byte arrays. This is an example
of
     * "select a serialization scheme from
serialization
     * scheme library" of operation 402, as well as
     * operation 403.
     */
    SerializationScheme byteArrayScheme =
theSerializationModuleLibrary
            .lookupSerializationScheme("sourceType="
                    + aByteArray.getClass().getName()
                    + ", sourceSize=" +
aByteArray.length);
    byte[] byteArray = byteArrayScheme
            .serialize(aByteArray);
    os.write(byteArray);
  }
```

```
  /* Write a String, taking into account any
annotations. */
  private void writeString(MessageContext msgContext,
          ObjectOutputStream oos, Class aStringClass,
          String aString) throws IOException {
    // Try to retrieve the field annotations we care
    // about. These two lines are examples of the
first
    // part of operation 402 of Figure 4, i.e.,
    // "examine message element".
    SerializationSize sizeAnnotation =
(SerializationSize) aStringClass
          .getAnnotation(SerializationSize.class);
    Encrypted encryptionAnnotation = (Encrypted)
aStringClass
          .getAnnotation(Encrypted.class);

/*
     * If the encryption annotation is present and the
     * encryption level is not "NONE" then encrypt the
     * field.
     */
    if (null != encryptionAnnotation
          && encryptionAnnotation.strength() !=
EncryptionStrength.NONE) {
      /*
       * If encryption is always to be done, or if
       * encryption is specified only for unencrypted
       * connections and the connection is not
encrypted,
       * then encrypt the field. The encryption
decision
       * depends on both the message context
(encryption of
       * the connection) and the attribute context
(encrypt
       * field if link isn't encrypted, or always
encrypt
       * the field).
       */
      if ((encryptionAnnotation.context() ==
EncryptionContext.ALWAYS)
              || ((encryptionAnnotation.context() ==
EncryptionContext.ONLY_IF_LINK_UNENCRYPTED &&
!msgContext.secureConnection)))
        /*
```

```
         * The encryption strength is retrieved from the
         * annotation and passed to the method that does the
         * encryption, which is another serialization
         * parameter retrieved from the attribute context.
         * This is the "Examine message element" part of
         * operation 402 of Figure 4.
         */
        aString = encrypt(aString, encryptionAnnotation
                .strength());
    }

/*
     * If the size annotation suggests this is a large
     * string, or if the connection isn't fast, compress the
     * string. The compression decision depends on both the
     * message context and the attribute context. If we
     * decide to compress the String, ask the serialization
     * module library to find and return a serializer that
     * compresses String objects of the size of aString. If
     * aString is small the library might return a
     * serializer that does no compression, while if aString
     * is large the library will return a serializer that
     * compresses strings.
     */
    if (null != sizeAnnotation && sizeAnnotation.large()
            || !msgContext.fastConnection) {
        // This is an example of "select a serialization
        // scheme from serialization scheme library"
        // of operation 402, as well as operation 403.
        SerializationScheme compressor = theSerializationModuleLibrary
```

```
.lookupSerializationScheme("type=compression,
sourceType="
                    + String.class.getName()
                    + ", sourceSize=" +
aString.length());
      // This is an example of the first part of
operation
      // 405 of Figure 4.
      aString = new
String(compressor.serialize(aString));
    }
    // This is an example of "select a serialization
    // scheme from serialization scheme library"
    // of operation 402, as well as operation 403.
    SerializationScheme stringScheme =
theSerializationModuleLibrary
          .lookupSerializationScheme("sourceType="
                    + String.class.getName()
                    + ", sourceSize=" +
aString.length());
    // This is an example of the second part of
operation
    // 405 of Figure 4.
    byte[] byteArray =
stringScheme.serialize(aString);
    oos.writeObject(byteArray);
  }
}

// ======================

/**
 * This is the application module, element 110 of
Figures 1,
 * 2, and 3.
 */
public class ApplicationModule {
  /**
   * A reference to the serialization processor,
element 121
   * of Figure 2.
   */
  private SerializationProcessor
theSerializationProcessor;

/**
```

```
  * A reference to the serialization scheme library,
  * element 123 of Figure 2.
  */
 private SerializationSchemeLibrary
theSerializationSchemeLibrary;

/**
  * The environment in which the serialization is
carried
  * out.
  */
 private MessageContext theMessageContext;

/**
  * Constructor to build an instance.
  */
 public ApplicationModule(
         SerializationSchemeLibrary aLibrary,
         MessageContext messageContext) {
   theSerializationSchemeLibrary = aLibrary;
   theMessageContext = messageContext;
 }

/**
  * This is where serialization starts, i.e., this is
where
  * the message to be serialized arrives. The call to
this
  * method is step 400 of Figure 4.
  */
 public void serializeMessage(Message aMessage)
         throws IOException {
   /*
    * Creating the message buffer also writes the
header
    * information, which is step 401 of Figure 4. The
variable encodedMessageBuffer is exactly
    * the "encoded message buffer", element 122 of
Figure 2.
    */
   ByteArrayOutputStream encodedMessageBuffer = new
ByteArrayOutputStream();

/*
    * The application module has reached the
equilavent of
```

```
     * step 410 of Figure 4, i.e., the message has
been
     * successfully encoded (serialized). The buffer
     * encodedMessageBuffer is ready for transfer.
     */
  }

}
```

As may be observed from the above example software code, one example of a type of encoding selected by the dynamic serialization scheme selection may include determining whether to select a particular serialization scheme that provides a predetermined level of encryption.

Each serialization scheme may be stored with metadata attributes specifying properties of its encoding algorithms (e.g., secure, small, fast, etc.). The message elements of a message (e.g., a parameter of remote invocation) may be examined in its message context to determine if it is "large" (e.g., a video file) and a search for a fast compressing serialization scheme will be performed.

TABLE 2 discloses four example encryption strengths, which include: none, weak, medium and strong. When an individual message element is received by the serialization module 120, an annotation of an attribute field may be observed and used to select the serialization scheme that accommodates the encryption noted by the annotation.

Figure 3:
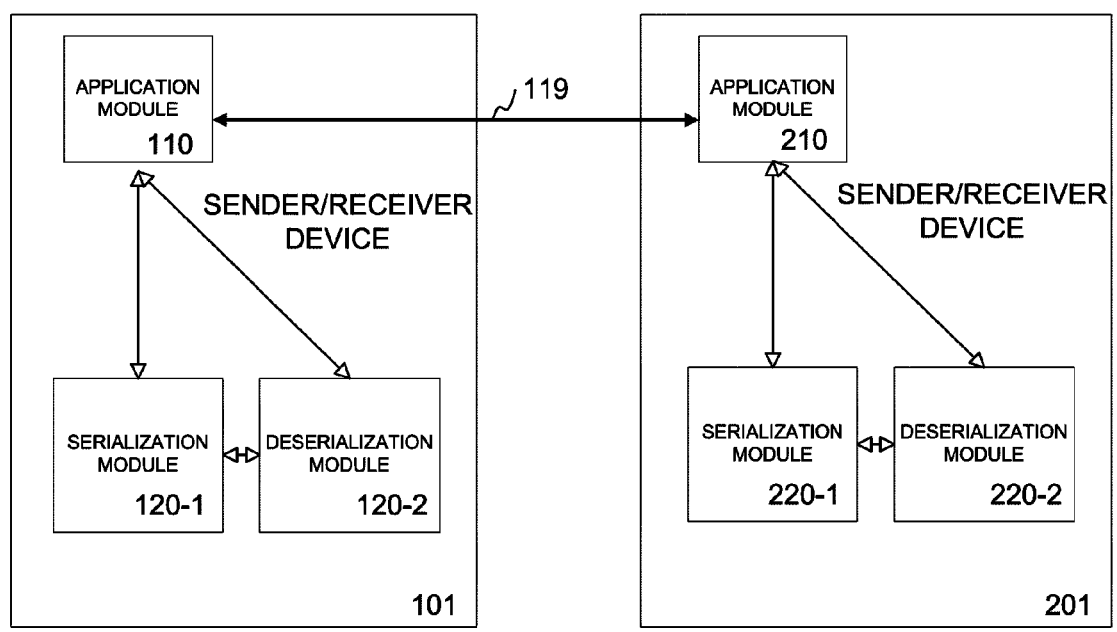
FIG. 3 illustrates a plurality of sending/receiving devices according to an example embodiment of the present inventive concept.

FIG. 3 illustrates another example embodiment according to the present inventive concept. Like numerals in FIG. 3 represent like elements in previous drawings. Referring to FIG. 3, the serialization module 120-1 is coupled to a deserialization module 120-2. In this example, both the modules 120-1 and 120-2 are part of the same sender/receiver device 101. Similarly, sender/receiver device 201 includes serialization and deserialization modules 220-1 and 220-2. In operation, the serialization module 120-1 may rely on information provided by the deserialization module 120-2 to determine which serialization scheme should be applied. The deserialization module 120-2 may provide information regarding past serialization schemes preferred by a remote node and used to serialize information transferred to the remote node.

In another example embodiment a dynamic deserialization operation may be performed. For example, a message or byte stream may be received that includes at least one message element. The message and/or byte stream may include a message header that is examined via a processing operation. The message header may include a descriptor, or, more specifically, a deserialization descriptor indicative of the type of deserialization that is required. Determining the type of deserialization descriptor may provide a deserialization scheme needed to perform the deserialization. Next, the appropriate deserialization scheme may be accessed from a deserialization library based on the deserialization descriptor. The at least one message element may then be decoded using the selected deserialization scheme.

The above example embodiments may be implemented in software code, and may be stored on a computer readable medium, such as, for example, non-volatile memory devices (e.g., RAM, ROM, hard disk etc.). The software code may be accessed from the computer readable medium and may be executed by a processor, such as, for example the serialization processor 121. The executed program may provide one or more of the features of the example embodiments described above.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of dynamic serialization of a message, the method comprising:
   receiving, at a processing device, a message including at least one message element requiring serialization;
   examining, at the processing device, a first message element of the message to determine at least one first message element attribute;
   selecting, at the processing device, a serialization scheme from a serialization scheme library stored in a storage device based on the at least one examined first message element attribute of the first message element; and
   encoding, at the processing device, at least the first message element based at least in part on the serialization scheme.

2. The method of claim 1, further comprising:
   placing the encoded first message element into an encoded message buffer.

3. The method of claim 2, further comprising:
   notifying an application module that the encoded message is available after the encoding operation is completed; and
   retrieving the encoded message from the encoded message buffer.

4. The method of claim 1, further comprising:
   repeating the examining and the selecting on a second message element of the message to select a second serialization scheme from the serialization scheme library based at least in part on at least one second message element attribute; and
   encoding the second message element based at least in part on the second serialization scheme.

5. The method of claim 4, wherein the second serialization scheme is different from the first serialization scheme.

6. The method of claim 5, wherein the first serialization scheme or the second serialization scheme provide a greater level of security than other serialization schemes.

7. The method of claim 5, wherein the first serialization scheme or the second serialization scheme provide a greater level of data compression than other serialization schemes.

8. The method of claim 4, further comprising:
   placing the encoded second message element into an encoded message buffer.

9. The method of claim 8, wherein a number of encoded message elements in the encoded message buffer is not greater than the at least one message element.

10. The method of claim 4, further comprising:
    encoding a message header or a message footer of the message using a serialization scheme different from the first serialization scheme or the second serialization scheme; and
    placing the encoded message header or the encoded message footer into the encoded message buffer.

11. The method of claim 1, further comprising:
    repeating the examining and the selecting on a second message element; and
    encoding the second message element using the serialization scheme.

12. The method of claim 11, wherein the encoded first message element and the encoded second message element are encoded into a single encoded message element.

13. The method of claim 1, wherein the encoding comprises at least one of compression or encryption.

14. The method of claim 13, wherein the encryption is one level of at least two different levels of encryption assigned to at least two serialization schemes from the serialization scheme library.

15. An apparatus configured to perform dynamic serialization of a message, the apparatus comprising:
    a receiver circuit configured to receive a message including at least one message element requiring serialization; and a serialization circuit configured to examine a first message element of the message, to select a serialization scheme from a serialization scheme library stored in a storage device based at least in part on an attribute of the first message element, and to encode at least the first message element using the serialization scheme selected from the serialization scheme library.

16. The apparatus of claim 15, further comprising:
an encoded message buffer configured to store the encoded first message element.

17. The apparatus of claim 15, wherein the serialization circuit is further configured to examine a second message element of the message, to select a second serialization scheme from the serialization scheme library based at least in part on a second attribute of the second message element, and to encode the second message element using the second serialization scheme.

18. The apparatus of claim 17, wherein the second serialization scheme is different from the first serialization scheme.

19. The apparatus of claim 17, wherein the first serialization scheme or the second serialization scheme provide a greater level of security than other serialization schemes.

20. The apparatus of claim 15, wherein the serialization circuit is further configured to encode at least the first message element using compression or encryption.

21. The apparatus of claim 20, wherein the encryption comprises one level of at least two different levels of encryption assigned to at least two serialization schemes from the serialization scheme library.

22. The apparatus of claim 15, wherein the storage device is located locally within the apparatus.

23. The apparatus of claim 15, wherein the storage device is located remotely from the apparatus.

24. A computer readable medium comprising a computer program product that when executed causes a processor to perform:
receiving a message including at least one message element requiring serialization;
examining a first message element of the message;
selecting a serialization scheme from a serialization scheme library based on at least one attribute of the first message element; and
encoding at least the first message element using the serialization scheme selected.

25. A method of dynamic deserialization of a message, the method comprising:
receiving, at a device, a byte stream including at least one message element requiring deserialization;
examining, at the device, a message header in the byte stream to determine at least one deserialization descriptor;
selecting, from a deserializaton scheme library stored in a storage device, a deserialization scheme based at least in part on a deserialization descriptor; and
decoding the at least one message element using the deserialization scheme.

* * * * *